April 14, 1931.   H. T. WOOLSON   1,800,585
OIL FILTER
Filed Feb. 8, 1928

INVENTOR
HARRY T. WOOLSON.
BY
ATTORNEY

Patented Apr. 14, 1931

1,800,585

UNITED STATES PATENT OFFICE

HARRY T. WOOLSON, OF DETROIT, MICHIGAN, ASSIGNOR TO CHRYSLER CORPORATION, OF DETROIT, MICHIGAN, A CORPORATION OF DELAWARE

OIL FILTER

Application filed February 8, 1928. Serial No. 252,766.

This invention relates to an oil filter and more particularly to an oil filter for use in the oil sump of an internal combustion engine.

It is an important object of this invention to provide an oil filter, for the suction pipe of the oil pump, submerged in the oil supply in the crankcase of an internal combustion engine, whereby oil may be allowed to pass from the crank case, through the filter, into the suction line and oil pump and from there to the various parts of the engine to be lubricated.

Another object of the invention is to provide a means for creating an air chamber within the filter which maintains a predetermined oil level within the filter, and to provide a means for raising that oil level as the portion of the filter below the oil level becomes clogged by the sediment filtered from the oil or from other causes.

A further object of the invention is to provide a device of inexpensive and economical construction, which may be readily assembled or disassembled to permit replacement or cleaning.

The above and other objects of my invention will more fully appear from the following description, taken in connection with the accompanying drawing, in which.

Figure 1:
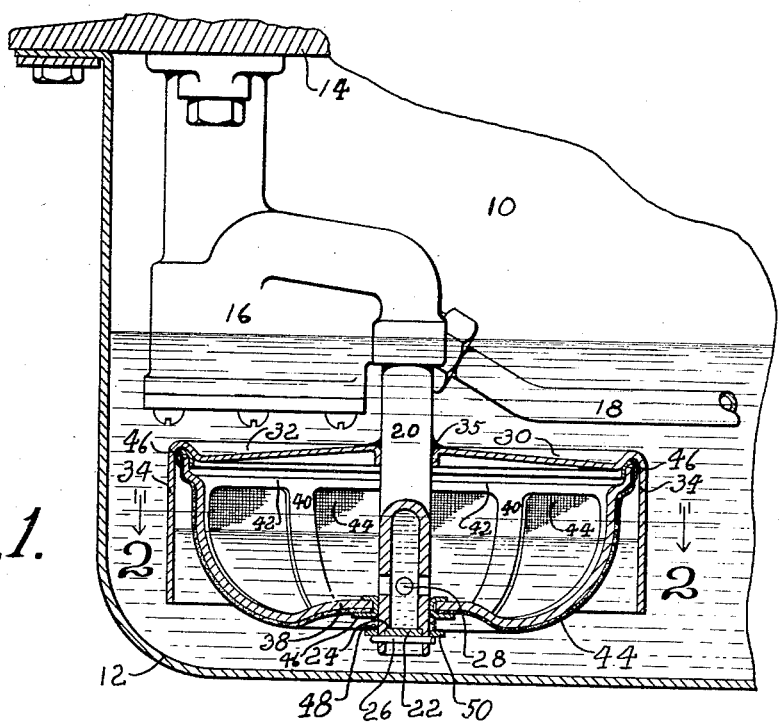
Fig. 1 is a sectional view thru a portion of the crankcase of an internal combustion engine showing my improved device in section, as well as a conventional oil pump in elevation, the suction pipe for the pump being partly in section.
Figure 2:
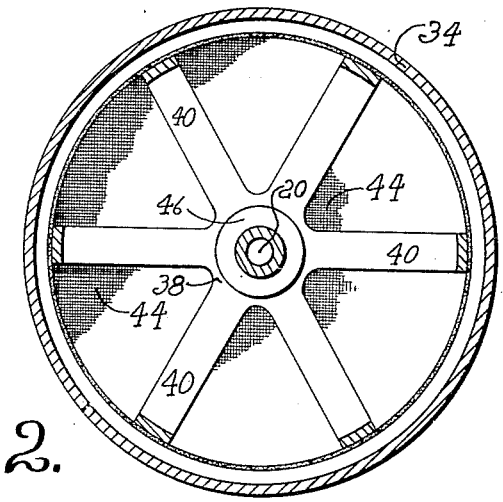
Fig. 2 is a sectional view on 2—2 of Fig. 1, as viewed in a direction indicated by the arrows.

Referring to an illustrated embodiment of my invention, I have shown an engine crankcase 10, formed by uniting an oil pan 12 with the cylinder block 14. A conventional oil pump 16 is provided with a conduit 18, shown broken away, adapted to deliver oil from the oil pump to the various parts of the engine to be lubricated. A vertically disposed conduit 20 is adapted to have its lower end positioned adjacent the bottom of the crankcase and its upper end in communication with the oil pump, forming a suction pipe thru which oil is drawn from the crankcase to the oil pump, there to be forced thru the conduit 18.

The lower end of the conduit 20 is closed by a plug 22 which is received against a shoulder 24 formed by counterboring the open end. A pin 26, passing thru openings in the wall of the conduit 20, secures the plug 22 in position, or the plug 22 may be pressed in the counterbore. Openings 28 are provided in the wall of the conduit 20 to permit the oil to enter the conduit 20 thru the side thereof rather than thru the bottom.

Positioned on the conduit 20, above the openings 28, is a drum shaped casing 30 consisting of an upper plate 32, extending horizontally and an annular flange or skirt 34 extending vertically therefrom at the outer edge of the plate 32. The upper plate is joined to the conduit as at 35, forming a liquid tight seal. The bottom of the casing 30 is open so that the oil in the crankcase may enter the casing thru the bottom. As the upper plate 32 is closed and the bottom is sealed by the oil, an air chamber is provided within the casing which normally maintains a predetermined oil level within the casing that is lower than the level outside the casing as is shown in Fig. 1.

Slidably mounted on the lower end of the conduit 20, below the openings 28, is a bowl shaped spider consisting of a center plate 38 having diverging arms 40 extending outwardly and upwardly, being joined together at their ends by a ring 42. A screen 44, or other suitable filtering material, is provided over the outer surface of the spider and is secured thereto by binders 46 folded over the upper edges of the ring 42 and screen 44, and over the periphery of the opening in the plate 38 and screen 44 thru which the lower end of the conduit 20 extends.

A coil spring 48, around the conduit 20, is positioned between the lower edge of the spider 36 and a washer 50, the latter being positioned on the lower end of the conduit 20 by the pin 26. The pin 26 may be removed for the purpose of replacement or cleaning of the screen 44. The spring 48 also serves to urge the spider 36 against the upper plate 32 of the drum shaped casing 30 to prevent rattle.

It will be well understood that in the normal operation of my improved device, oil in the crankcase will be drawn by the suction of the pump 16 thru that portion of the screen below the oil level within the casing 30, openings 28, and conduit 20, to be passed on by the pump for the suitable lubrication of the various parts. Should the portion of the screen below the oil level become clogged so that oil may not pass therethru, the suction of the pump will draw air from the trapped air chamber, above the oil level in the casing 30, and thereby permit raising of the oil level to permit the oil to flow thru another portion of the screen above the original oil level. By this construction, provision has been made for continuously filtering the oil after certain portions of the screen have become clogged.

While I have described what I deem to be the preferred embodiment of my invention, it will be obvious that various changes may be made in the arrangement, combination and construction of the various parts of my improved device without departing from the spirit of my invention, and it is not my intention to limit its scope other than by the terms of the appended claims.

What I claim is:

1. A device of the class described comprising a conduit having a side opening and closed at its lower end, a cup shaped filtering means detachably secured on said conduit between the side opening and the closed lower end of said conduit, a substantially fluid tight cup shaped casing secured to said conduit above the side opening projecting outwardly in sealing contact with the upper edge of the cup shaped filtering means and projecting downwardly around said filtering means to a point below the side opening in said conduit.

2. A device of the class described comprising a substantially fluid tight cup shaped casing arranged in an inverted position, a cup shaped filtering member within said casing having its open end extending upwardly in liquid sealing engagement with said casing, and a conduit through said casing having an inlet opening within the cup shaped filtering member and above the lower edge of said casing.

3. In a filter, a conduit having an inlet opening, a cup shaped frame mounted on said conduit below said inlet opening, a shield on said conduit above said opening substantially surrounding said frame, and a screen on said frame engaged over the outer edge thereof, said screen being clamped between said shield and the outer edge of said frame.

4. In a filter, a conduit having inlet openings in the side thereof, a cup shaped frame mounted on said conduit on one side of the inlet openings thereof, a shield mounted on said conduit on the opposite side of said inlet openings comprising an end wall and a cylindrical skirt, the adjacent parts of said end wall and skirt being crimped, and a screen on the exterior of said frame having edge portions surrounding the outer edges of said frame and engaged between the latter and the crimped part of said shield.

5. The combination with a crank case lubricant reservoir, of a suction pump, an inlet conduit in communication with said pump having inlet apertures in the sides thereof and a closed outer extremity, a shield mounted on said conduit having an impervious upper wall above said apertures including a depending impervious skirt, and a filtering member having foraminous side walls and a foraminous lower wall below said apertures and lying substantially within said skirt, said filtering member and shield being submerged in the oil of said reservoir and forming an air pocket therein for temporarily preventing utilization of the upper portion of the foraminous side walls of said filtering member until the lower wall portions become clogged.

6. The combination with a crank case lubricant reservoir, of a suction pump, an inlet conduit in communication with said pump having inlet apertures in the sides thereof and a closed outer extremity, a shield submerged in said reservoir including an upper impervious wall and a deep depending skirt part, and a foraminous body within which said inlet apertures are located, said body being provided with deep filtering walls and forming with the skirt part a deep elongated downwardly open air pocket.

HARRY T. WOOLSON.